United States Patent
Tsoutsoura et al.

(10) Patent No.: US 11,390,741 B2
(45) Date of Patent: Jul. 19, 2022

(54) EPOXY RESIN COMPOSITIONS CONTAINING AN INTERNAL MOLD RELEASE AGENT

(71) Applicant: Dow Global Technologies LLC, Midland, MI (US)

(72) Inventors: Aikaterini Tsoutsoura, Zurich (CH); Timothy A. Morley, Schindellegi (CH); Rainer Koeniger, St. Gallenkappel (CH); Rene P. Geiger, Rueschlikon (CH); Luis G. Madrigal, Richterswil (CH); Luca Lotti, Wollerau (CH); Nebojsa Jelic, Wangen (CH); Zeljko Sikman, Lachen (CH); Evelyn A. Zaugg-Hoozemans, Horgen (CH); Martin R. Greaves, Baar (CH)

(73) Assignee: Dow Global Technologies LLC, Midland, MI (US)

( * ) Notice: Subject to any disclaimer, the term of this patent is extended or adjusted under 35 U.S.C. 154(b) by 729 days.

(21) Appl. No.: 16/322,638

(22) PCT Filed: Aug. 3, 2017

(86) PCT No.: PCT/US2017/045376
§ 371 (c)(1),
(2) Date: Feb. 1, 2019

(87) PCT Pub. No.: WO2018/034856
PCT Pub. Date: Feb. 22, 2018

(65) Prior Publication Data
US 2022/0002536 A1 Jan. 6, 2022

Related U.S. Application Data

(60) Provisional application No. 62/377,444, filed on Aug. 19, 2016.

(51) Int. Cl.
*C08L 63/00* (2006.01)

(52) U.S. Cl.
CPC .................................. *C08L 63/00* (2013.01)

(58) Field of Classification Search
CPC ........................................................ C08L 63/00
See application file for complete search history.

(56) References Cited

U.S. PATENT DOCUMENTS

2005/0221094 A1 10/2005 Uchida
2013/0037840 A1 2/2013 Onishi

FOREIGN PATENT DOCUMENTS

EP 2723796 A 4/2014
WO 2012/177392 A 12/2012

OTHER PUBLICATIONS

Bjekovic, Epoxy resina and release agents part I . . ., J. App. Engineering Science 13(2015)1,312.

*Primary Examiner* — Arrie L Reuther

(57) ABSTRACT

Alkoxylated hydrophobes that include a poly(alkylene oxide) chain of at least 5 oxyalkylene units having a terminal secondary hydroxyl group or a terminal $C_{1-8}$ hydrocarbyl group are effective internal mold release agents for epoxy resin moldings. The alkoxylated hydrophobe, when mixed with an epoxy resin, forms a mixture that is highly stable when heated to 80 to 100° C. and held at that temperature for a period of as much as 22 days.

18 Claims, No Drawings

EPOXY RESIN COMPOSITIONS CONTAINING AN INTERNAL MOLD RELEASE AGENT

This invention relates to epoxy resin compositions that contain an internal mold release agent, and methods for making cured epoxy resins from such compositions.

Epoxy resins are used as the resin binder phase in composites. These composites are made in molding processes such as resin transfer molding (RTM) and liquid compression molding (LCM) processes, in which an epoxy resin composition is cured in a mold in the presence of reinforcing fibers.

Low-cost production of these composites requires that the process operate with a short cycle time. The cycle time is the time required to produce a part and prepare the equipment to produce the next succeeding one.

A significant component of cycle time is the time needed to remove the finished part from the mold and prepare the mold for the succeeding shot. Epoxy resins are powerful adhesives and therefore tend to stick to the internal mold surfaces, making the demolding step difficult and slow.

Mold release agents are used to combat this problem. There are two main classes of mold release agents. External mold release agents are applied to the interior mold surfaces at the beginning of a production run, before the mold is filled the first time, and periodically thereafter. External mold release agents can be very effective but are disadvantaged because they usually need to be applied manually. Production rates are slowed because the manufacturing process must be interrupted each time the internal mold release is applied.

In contrast to external mold release agents, internal mold release agents (IMRs) are carried into the mold when the mold is filled. Therefore, they do not need to be applied manually or in a separate step in the manufacturing process. IMRs often are used in conjunction with external mold release agents. In those cases, the IMRs allow the manufacturer to apply the external mold release agent less frequently, thereby reducing the time required to perform each cycle in which the step of applying the external mold release agent is omitted. Sometimes, it is possible to completely eliminate the need to apply the external mold release agent.

A second important way to reduce cycle time is to increase the reactivity of the epoxy resin system so curing takes place more rapidly. For this reason, the epoxy resin is frequently preheated, which has the dual benefits of reducing its viscosity and speeding the cure. Frequently, the epoxy resin is kept in a heated tank, from which it is fed to a mixhead where it is mixed with a hardener (also frequently preheated) and then injected into the mold or sprayed onto a fiber preform that is then introduced into the mold.

Certain ethoxylated compounds are known to be effective IMRs for epoxy resin compositions. These materials are polyethers formed by polymerizing ethylene oxide onto a hydrophobic initiator compound such as a fatty acid, a fatty alcohol or an alkyl phenol. These ethoxylated IMRs have a significant drawback in that they are reactive with epoxy resins. These reactions lead to a loss of effectiveness of the IMR, particulate formation and degraded thermal and/or mechanical properties in the cured resin. The problem is especially acute when the epoxy resin is preheated, as the higher temperatures accelerate the reaction between the ethoxylated IMR and the epoxy resin. In a production setting, the epoxy resin/IMR mixture may be maintained at elevated temperatures for hours or even days before being dispensed. The prolonged time at high temperature favors the unwanted reaction.

Because of these problems, ethoxylated IMRs are generally not combined with the epoxy resin in advance of the molding process, but instead are mixed with the other components just before they are injected into the mold. Because the amount of IMR is small compared to the amount of epoxy resin, it is difficult to meter the IMR stream accurately and consistently. This leads to inconsistent performance.

What is desired is an IMR for an epoxy resin system. The IMR should impart good release characteristics to the molded and cured resin, and should react slowly if at all with the epoxy resin at temperatures up to 100° C. The IMR should have little if any deleterious effect on the mechanical and thermal properties of the cured resin.

This invention is an epoxy resin mixture comprising at least one epoxy resin mixed with 0.2 to 5 parts by weight, per 100 parts by weight of the at least one epoxy resin, of one or more alkoxylated hydrophobes that include a poly(alkylene oxide) chain of at least 5 oxyalkylene units having i) a terminal hydroxyl group, provided that at least 50% of the hydroxyl groups provided by the one or more alkoxylated hydrophobes are secondary hydroxyl groups, or ii) a terminal $C_{1-8}$ hydrocarbyl group, the poly(alkylene oxide) chain being bonded at one end through a linking group to a hydrophobe that includes an unsubstituted aliphatic hydrocarbyl group of at least 10 carbon atoms.

The invention also is a method for making a cured epoxy resin, comprising filling a mold with a curable epoxy resin composition and curing the curable epoxy resin composition in the mold, wherein the curable epoxy resin composition includes a hardener and an epoxy resin mixture that contains at least one epoxy resin mixed with 0.2 to 5 parts by weight, per 100 parts by weight of the at least one epoxy resin, of an alkoxylated hydrophobe that includes a poly(alkylene oxide) chain of at least 5 oxyalkylene units having i) a terminal hydroxyl group, provided that at least 50% of the hydroxyl groups provided by the one or more alkoxylated hydrophobes are secondary hydroxyl groups, or ii) a terminal $C_{1-8}$ hydrocarbyl group, the poly(alkylene oxide) chain being bonded at one end through a linking group to a hydrophobe includes an unsubstituted aliphatic hydrocarbyl group of at least 10 carbon atoms.

The alkoxylated hydrophobe includes a hydrophobic portion (the "hydrophobe") bonded to a poly(alkylene oxide) chain). The poly(alkylene oxide) chain is bonded to the hydrophobe through a linking group.

The alkoxylated hydrophobe in some embodiments corresponds to structure I:

$$A\text{-}X\text{—}B\text{—}OR \qquad (I)$$

wherein A represents the hydrophobe, X represents a linking group, B represents the poly(alkylene oxide) chain and R represents hydrogen or a capping group having 1 to 8 carbon atoms. When R is hydrogen, at least 50% of the B groups provided by the alkoxylated hydrophobe include secondary carbon atom to which is bonded the oxygen connecting B to R. The OR group in such a case is a terminal secondary hydroxyl. The X group may be, for example, an ether oxygen, an amine nitrogen, an ester group, a urethane group, a urea group, a sulfur atom, and the like.

The hydrophobe (i.e., the A group in structure I) includes an unsubstituted aliphatic hydrocarbyl group of at least 10 carbon atoms. It may contain at least up to 24 carbon atoms, and preferably contains 10 to 18 carbon atoms. By "unsubstituted", it is meant that the aliphatic hydrocarbyl group contains no heteroatom-containing substituents (i.e., no substituents containing atoms other than carbon and hydrogen atoms). It may contain hydrocarbyl substituents, i.e., substituents that include only hydrogen and carbon atoms. Examples of hydrocarbyl substituents include aryl groups such as phenyl, alkyl groups, and alkenyl groups. The unsubstituted aliphatic hydrocarbyl group may be saturated or unsaturated. If unsaturated, it may contain one or more carbon-carbon double bonds or carbon-carbon triple bonds along the length of the chain.

In some embodiments, the hydrophobe is a straight-chain alkyl group having 10 to 24 carbon atoms, especially 10 to 18 carbon atoms; a straight-chain mono-, di- or tri-alkene having 10 to 24, especially 10 to 18 carbon atoms; or an alkyl- or alkenyl-substituted phenyl in which the alkyl or alkenyl group is a straight-chain group having 10 to 24, especially 10 to 18 carbon atoms.

In some embodiments, the alkoxylated hydrophobe is produced by alkoxylating a fatty acid having 10 to 24, especially 10 to 18 carbon atoms, by alkoxylating a fatty alcohol having 10 to 24, especially 10 to 18 carbon atoms, or an alkyl- or alkenyl phenol in which the alkyl or alkenyl group contains 10 to 24, especially 10 to 18 carbon atoms.

The poly(alkylene oxide) chain may contain at least 5, at least 8, at least 10 or at least 12 oxyalkylene units. It may contain, for example, up to 50, up to 35 or up to 25 oxyalkylene units. The oxyalkylene units may contain, for example 2 to 4, carbon atoms and may be, for example, oxyethylene units such as are formed by polymerizing ethylene oxide, 2-methyloxyethylene units such as are formed by polymerizing 1,2-propylene oxide, 2-ethyloxyethylene units such as are formed by polymerizing 1,2-butylene oxide, n-propyleneoxy units such as are formed by polymerizing 1,3-propylene oxide, 1,2-dimethyloxyethylene oxide units such as are formed by polymerizing 2,3-butylene oxide and/or n-butyleneoxy units such as are formed by polymerizing tetrahydrofuran. Mixtures of two or more of such oxyalkylene units may be present.

The poly(alkylene oxide) chain may be formed by polymerizing one or more alkylene oxides. The polymerization preferably is performed in the presence of an initiator compound that contains the hydrophobe and a functional group that is susceptible to alkoxylation, such as a hydroxyl, carboxylic acid, primary amino, secondary amino or thiol group.

In some embodiments, the poly(alkylene oxide) chain can be formed by polymerizing any of ethylene oxide, 1,2-propylene oxide, 1,3-propylene oxide, 1,2-butylene oxide or tetrahydrofuran by itself; by the random copolymerization of any two or more thereof; or by the sequential polymerization of any two or more thereof.

In a specific embodiment, the poly(alkylene oxide) chain is a poly(1,2-propylene oxide). An alkoxylated hydrophobe made by polymerizing poly(1,2-propylene oxide) will contain mainly secondary hydroxyl groups, unless the hydroxyl groups are capped. Secondary hydroxyl groups are bonded to a carbon atom which itself is bonded to two other carbon atoms. Primary hydroxyl groups are bonded to a methylene ($-CH_2-$) group.

In a second specific embodiment, the poly(alkylene oxide) chain is a block copolymer having an internal poly(ethylene oxide) block and a terminal poly(1,2-propylene oxide) block. Such a block copolymer is conveniently formed by polymerizing ethylene oxide and then 1,2-propylene oxide in sequence. Unless capped, the terminal poly(1,2-propylene oxide) block produces mostly secondary hydroxyl groups at the end of the poly(alkylene oxide) chains.

In a third specific embodiment, the poly(alkylene oxide) chain is a block copolymer having an internal poly(ethylene oxide) block and a terminal poly(1,2-butylene oxide) block. Such a block copolymer is conveniently formed by polymerizing ethylene oxide and then 1,2-butylene oxide in sequence. Unless capped, the terminal poly(1,2-butylene oxide) block produces mostly secondary hydroxyl groups at the end of the poly(alkylene oxide) chain.

In a fourth specific embodiment, the poly(alkylene oxide) chain is a block copolymer having a poly(1,2-propylene oxide) block and a poly(1,2-butylene oxide) block. These blocks may be arranged in any order, by polymerizing the respective oxides in the desired sequence. Unless capped, the terminal block produces mostly secondary hydroxyl groups at the end of the poly(alkylene oxide) chain.

In a fifth specific embodiment, the poly(alkylene oxide) chain is a random copolymer of 1,2-propylene oxide and 1,2-butylene oxide. Unless capped, the random copolymerization produces mostly secondary hydroxyl groups at the end of the poly(alkylene oxide) chain.

At least 50%, at least 75%, at least 85% or at least 90% and up to 100% of the hydroxyl groups provided by the alkoxylated hydrophobe may be secondary hydroxyl groups.

The terminal poly(alkylene oxide) chain may be capped by reaction with a capping group that contains 1 to 8 carbon atoms. The capping group may be bonded to the poly(alkylene) oxide chain through, for example, an ether group, a urethane group, an ester group, a urea group or an amino group. The capping group may include, for example, an alkyl group of 1 to 8 carbon atoms, a benzyl group or other phenyl-substituted alkyl group, an aryl group, and the like.

Commercially available materials that are useful as the alkoxylated hydrophobe include nonionic surfactants such as Dowfax® 25A414, Dowfax® 20B102, Dowfax®20A64, Dowfax®20A612, Dowfax®25A59, UCON™ OSP-18, UCON™ OSP-46, UCON™ OSP-68 and UCON™ OSP-220 surfactants, all sold by The Dow Chemical Company. The Dowfax® surfactants are prepared by sequentially adding ethylene oxide and then either 1,2-propylene oxide or 1,2-butylene oxide to a fatty alcohol having 12 to 18 carbon atoms. They have an internal poly(ethylene oxide) block and a terminal poly(1,2-propylene oxide) or poly(1,2-butylene oxide) block; all have at least 85% secondary hydroxyl groups. The UCON™ surfactants are prepared by simultaneously adding 1,2-propylene oxide and 1,2-butylene oxide to dodecanol so that the oxides are randomly or pseudo-randomly distributed as oxyalkylene units along the polymer backbone. All have at least 85% secondary hydroxyl groups.

The epoxy resin is one or more epoxy-containing compounds having a number average of at least 1.5, preferably at least 1.8, epoxide groups per molecule and a number average epoxy equivalent weight of up to 1000. The number average epoxy equivalent weight preferably is up to 500, more preferably is up to 250 and still more preferably is up to 225. The epoxy resin preferably has up to eight epoxide groups and more preferably has a number average of 1.8 to 4, especially 1.8 to 3 and most preferably 1.8 to 2.5, epoxide groups per molecule.

The epoxy resin (or mixture of epoxy resins, if a mixture is used) is preferably a liquid at room temperature to facilitate easy mixing with other components.

Among the useful epoxy resins include, for example, polyglycidyl ethers of polyphenolic compounds. One type of polyphenolic compound is a diphenol (i.e., has exactly two aromatic hydroxyl groups) such as, for example, resorcinol, catechol, hydroquinone, biphenol, bisphenol A, bisphenol AP (1,1-bis(4-hydroxylphenyl)-1-phenyl ethane), bisphenol F, bisphenol K, tetramethylbiphenol, or mixtures of two or more thereof. The polyglycidyl ether of such a diphenol may be advanced, provided that the epoxy equivalent weight is about 1000 or less, preferably about 250 or less and more preferably about 225 or less.

Other useful polyglycidyl ethers of polyphenols include epoxy novolac resins. The epoxy novolac resin may contain, for example, 2 to 10, preferably 3 to 6, more preferably 3 to 5 epoxide groups per molecule. Among the suitable epoxy novolac resins are those having the general structure III:

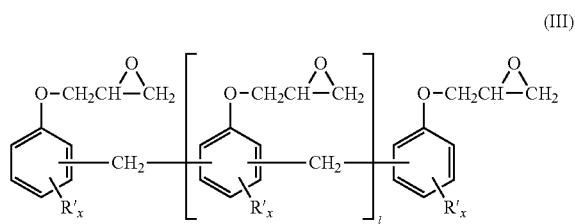

in which l is 0 to 8, preferably 1 to 4, more preferably 1 to 3, each R' is independently alkyl or inertly substituted alkyl, and each x is independently 0 to 4, preferably 0 to 2 and more preferably 0 to 1. R' is preferably methyl if present.

Other useful polyglycidyl ethers of polyphenol compounds include, for example, tris(glycidyloxyphenyl)methane, tetrakis(glycidyloxyphenyl)ethane and the like.

Still other useful epoxy resins include polyglycidyl ethers of aliphatic polyols in which the epoxy equivalent weight is up to 1000, preferably up to 500, more preferably up to 250, and especially up to 200. These may contain 2 to 6 epoxy groups per molecule. The polyols may be, for example, alkylene glycols and polyalkylene glycols such as ethylene glycol, diethylene glycol, tripropylene glycol, 1,2-propane diol, dipropylene glycol, tripropylene glycol and the like, as well as higher functionality polyols such as glycerin, trimethylolpropane, trimethylolethane, pentaerythritol, sorbitol and the like. These preferably are used together with an aromatic epoxy resin such as a diglycidyl ether of a biphenol or an epoxy novolac resin.

Still other useful epoxy resins include tetraglycidyl diaminodiphenylmethane; oxazolidone-containing compounds as described in U.S. Pat. No. 5,112,932; cycloaliphatic epoxides; and advanced epoxy-isocyanate copolymers such as those sold commercially as D.E.R.™ 592, D.E.R.™ 6508 and D.E.R™ 6510 (Olin Corporation) as well as those epoxy resins described in WO 2008/140906.

In some embodiments, the epoxy resin component contains no more than 3%, preferably no more than 2% and still more preferably no more than 1% by weight of monohydrolyzed resin species. Monohydrolyzed resin species are α-glycol compounds formed by the addition of a molecule of water to an epoxide group.

A preferred epoxy resin contains 80 to 100 weight percent of a polyglycidyl ether of a polyphenol having a number average of 1.8 to 3, especially 1.8 to 2.5, epoxide groups per molecule and a number average epoxy equivalent weight of 125 to 225, especially 150 to 200. An especially preferred epoxy resin contains 80 to 100 weight percent of a diglycidyl ether of a bisphenol having an epoxy equivalent weight of 170 to 200 and a number average of 1.8 to 2.5 epoxide groups per molecule. The preferred and especially preferred epoxy resins may contain no more than 3%, preferably no more than 2% and still more preferably no more than 1% by weight of monohydrolyzed resin species.

The epoxy resin mixture of the invention contains 0.2 to 5 parts by weight of the alkoxylated hydrophobe per 100 parts by weight of the epoxy resin(s). Amounts within this range are generally adequate to provide good mold release properties. The amount of alkoxylated hydrophobe may be, for example, at least 0.5 part, at least 0.75 part, or at least 1 part by weight and up to 3 parts or up to 2.5 parts by weight per 100 parts by weight of the epoxy resin(s).

The epoxy resin mixture may further contain an alkali metal, ammonium or phosphonium salt of a phosphate ester. This phosphate ester salt includes a phosphate ($-OPO_3$) group that is bonded to an organic group. The organic group preferably contains an aromatic group such as phenyl or alkylphenyl, and/or a straight chain aliphatic hydrocarbyl group of at least 6 carbon atoms. In some embodiments, the phosphate ester salt is represented by the structure:

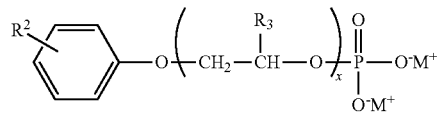

wherein $R^2$ and $R^3$ are independently hydrogen or alkyl such as $C_{1-4}$ alkyl, preferably hydrogen, methyl or ethyl, and x is a number from 1 to about 10. Each M is alkali metal, ammonium or phosphonium, preferably alkali metal, most preferably sodium or potassium.

The phosphate ester salt, when present, may be present in an amount of 0.1 to 2 parts by weight, preferably 0.25 to 1 part, per part by weight of the alkoxylated hydrophobe.

The combination of alkoxylated hydrophobe and phosphate ester salt often provides especially good mold release properties when the epoxy resin mixture is cured. An enhancement in glass transition temperature is sometimes seen as well.

The epoxy resin mixture of the invention can be formed into a curable epoxy resin composition by mixing it with a hardener, which is then cured. Because of its mold release properties, the epoxy resin mixture is particularly useful for making molded epoxy resins by curing the mixture in a mold.

The epoxy hardener is a compound or mixture of compounds having epoxy-reactive groups. The hardener may be, for example, a compound having two or more amine hydrogens, an anhydride compound, a di- or polycarboxylic acid, a thiol compound having two or more thiol groups, a phenolic compound having two or more phenolic groups, and the like. If desired, the epoxy hardener may be a latent or thermally activated type that melts or otherwise becomes reactive only when heated to a elevated temperature such as at least 80° C. Such latent or thermally activated hardeners are preferred for formulating a one-component curable epoxy resin composition.

Examples of suitable hardeners include phenolic hardeners such as D.E.H. 80, D.E.H. 81, D.E.H. 82, D.E.H. 84, D.E.H. 85 and D.E.H. 87 hardeners, from Olin Corporation; amine-epoxy adducts such as D.E.H. 4043, D.E.H. 4129, D.E.H. 4353, D.E.H. 4354, D.E.H. 444, D.E.H. 445, D.E.H. 4702, D.E.H. 4712, D.E.H. 4723, D.E.H. 487, D.E.H. 488, D.E.H. 489, D.E.H. 52, D.E.H. 530, D.E.H. 534, D.E.H. 536, D.E.H. 554, D.E.H. 581, D.E.H. 595 and D.E.H 4060, from Olin Corporation; modified polyamide curing agents such as D.E.H. 1504, D.E.H. 545 and D.E.H. 1450, from Olin Corporation; Mannich bases and modified amines such as D.E.H. 613, D.E.H. 614, D.E.H. 615, D.E.H. 616, D.E.H. 619, D.E.H. 622, and D.E.H. 630, from Olin Corporation; guanidines and substituted guanidines including dicyandiamine; melamine resins, aromatic amines such aniline, toluene diamine, diphenylmethanediamine, diethyltoluenediamine; urea compounds such as p-chlorophenyl-N,N-dimethylurea, 3-phenyl-1,1-dimethylurea, 3,4-dichlorophenyl-N,N-dimethylurea; imidazole compounds such as 2-ethyl-2-methylimidazole, benzimidazole and N-butylimidazole; polythiol curing agents such as mercaptoacetate and mercaptopropionate esters of low molecular weight polyols having 2 to 8, preferably 2 to 4 hydroxyl groups and an equivalent weight of up to about 75, in which all of the hydroxyl groups are esterified with the mercaptoacetate and alkylene dithiols such as 1,2-ethane dithiol, 1,2-propane dithiol, 1,3-propanedithiol, 1,4-butane dithiol, 1,6-hexane dithiol and the like, trithiols such as 1,2,3-trimercaptopropane, 1,2,3-tri(mercaptomethyl)propane, 1,2,3-tri(mercaptoethyl)ethane, (2,3-bis(2-mercaptoethyl)thio) 1-propanethiol; aminocyclohexanealkylamines such as cyclohexanemethanamine, 1,8-diamino-p-methane and 5-amino-1,3,3-trimethylcyclohexanemethylamine (isophorone diamine); linear or branched polyalkylene polyamines, N',N'-bis(2-aminoethyl)ethane-1,2-diamine, 2-methylpentane-1,5-diamine; other amine curing agents including gem-di-(cyclohexanylamino)-substituted alkanes, diaminocyclohexane, aminoethylpiperazine and bis((2-piperazine-1-yl)ethyl)amine; aminoalcohols including, for example, ethanolamine, diethanolamine, 1-amino-2-propanol, diisopropanolamine, anhydride hardeners such as styrene-maleic anhydride copolymers, nadic methyl anhydride, hexahydrophthalic anhydride, methylhexahydrophthalic anhydride, trimellitic anhydride, dodecyl succinic anhydride, phthalic anhydride, methyltetrahydrophthalic anhydride and tetrahydrophthalic anhydride and isocyanate hardeners such as toluene diisocyanate, methylene diphenyldiisocyanate, hydrogenated toluene diisocyanate, hydrogenated methylene diphenyldiisocyanate, polymethylene polyphenylene polyisocyanates (and mixtures thereof with methylene diphenyldiisocyanate, commonly known as "polymeric MDI"), isophorone diisocyanate, and the like. Still other additional hardeners include hardeners described in WO 2008/140906.

In some embodiments, the hardener includes at least one polyalkylene polyamine. The polyalkylene polyamine may have three or more amine hydrogens per molecule, up to as many as 10 or more. The alkylene groups each may contain from 2 to 8 carbons, preferably from 2 to 6 carbons, and can be linear or branched. The polyalkylene polyamine may have an amine hydrogen equivalent weight as low as about 20 to as much as 50. The molecular weight of the polyalkylene polyamine may be up to 500, preferably up to 200. The polyalkylene polyamine may contain one or more tertiary amino groups. The polyalkylene polyamine includes, for example, diethylene triamine, triethylene diamine, tetraethylenepentamine, higher polyethylene polyamines, N',N'-bis(2-aminoethyl)ethane-1,2-diamine, 2-methylpentane-1,5-diamine and the like. A hardener that includes a polyalkylene polyamine in some embodiments contains less than 0.5% by weight of aminoethylethanolamine.

Enough of the hardener is provided to cure the epoxy resin. The amount of hardener in specific embodiments may be less than a stoichiometric amount (i.e., the amount needed to consume all of the epoxy groups of the epoxy resin), such as at least 50%, at least 75% or at least 90% of the stoichiometric amount. A stoichiometric amount of hardener may be needed, or an excess of hardener over the stoichiometric amount, such as at least 5%, at least 10% or at least 20% more than the stoichiometric amount may be used. It is usually unnecessary to use greater than 50% more than or greater than 25% more than the stoichiometric amount.

The curing reaction may be performed in the presence of a catalyst for the epoxy curing reaction. In some embodiments, the catalyst includes a tertiary amine catalyst. It contains at least one tertiary amine group and is devoid of groups that are reactive towards epoxy groups. Suitable tertiary amine catalysts include tertiary aminophenol compounds, benzyl tertiary amine compounds, imidazole compounds, or mixtures of any two or more thereof.

Tertiary aminophenol compounds contain one or more phenolic groups and one or more tertiary amino groups. Examples of tertiary aminophenol compounds include mono-, bis- and tris(dimethylaminomethyl)phenol, as well as mixtures of two or more of these.

Benzyl tertiary amine compounds are compounds having a tertiary nitrogen atom, in which at least one of the substituents on the tertiary nitrogen atom is a benzyl or substituted benzyl group. An example of a useful benzyl tertiary amine compound is N,N-dimethyl benzylamine.

Imidazole compounds contain one or more imidazole groups. Examples of imidazole compounds include, for example, imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-undecylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']ethyl-s-triazine, 2,4-diamino-6-[2'-ethylimidazolyl-(1)']ethyl-s-triazine, 2,4-diamino-6-[2'-undecylimidazolyl-(1)']ethyl-s-triazine, 2-methylimidazolium-isocyanuric acid adduct, 2-phenylimidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole, and compounds containing two or more imidazole rings obtained by dehydrating any of the foregoing imidazole compounds or condensing them with formaldehyde.

Other catalysts include those described in, for example, U.S. Pat. Nos. 3,306,872, 3,341,580, 3,379,684, 3,477,990, 3,547,881, 3,637,590, 3,843,605, 3,948,855, 3,956,237, 4,048,141, 4,093,650, 4,131,633, 4,132,706, 4,171,420, 4,177,216, 4,302,574, 4,320,222, 4,358,578, 4,366,295, and 4,389,520, and WO 2008/140906, all incorporated herein by reference.

The catalyst is present in a catalytically effective amount. A suitable amount is typically about 0.1 to about 10 parts by weight of catalyst(s) per 100 parts by weight of epoxy resin(s). A preferred amount is 1 to 5 parts of catalyst(s) per 100 parts by weight of epoxy resin(s).

The catalyst may be blended into the epoxy resin mixture or, more preferably, into the hardener before the epoxy resin mixture and hardener are brought together to form the curable epoxy resin composition.

The curable epoxy resin composition may be cured in the presence of various optional ingredients, if desired. It is often convenient to incorporate these optional ingredients, if used, into either the epoxy resin mixture or the hardener, or both, before forming and curing the curable epoxy resin composition.

Other optional components that can be present include solvents or reactive diluents, pigments, antioxidants, preservatives, impact modifiers, non-fibrous particulate fillers including micron- and nano-particles, wetting agents and the like.

The solvent is a material in which the epoxy resin, hardener or both are soluble. The solvent is not reactive with the epoxy resin(s) or the hardener under the conditions of the polymerization reaction. The solvent (or mixture of solvents, if a mixture is used) preferably has a boiling temperature that is at least equal to and preferably higher than the curing temperature. Suitable solvents include, for example, glycol ethers such as ethylene glycol methyl ether and propylene glycol monomethyl ether; glycol ether esters such as ethylene glycol monomethyl ether acetate and propylene glycol monomethyl ether acetate; poly(ethylene oxide) ethers and polypropylene oxide) ethers; polyethylene oxide ether esters and polypropylene oxide ether esters; amides such as N,N-dimethylformamide; aromatic hydrocarbons such as toluene and xylene; aliphatic hydrocarbons; cyclic ethers; halogenated hydrocarbons; and mixtures of any two or more thereof. It is preferred to omit a solvent. If used, the solvent may constitute up to 75% of the weight of the curable epoxy resin composition (not including the weight of any fillers or reinforcing fiber), more preferably up to 30% of the weight thereof. Even more preferably the curable epoxy resin composition contains no more than 5% by weight of a solvent and most preferably contains less than 1% by weight of a solvent.

Suitable impact modifiers include natural or synthetic polymers having a $T_g$ of lower than −40° C. by differential scanning calorimetry. These include natural rubber, styrene-butadiene rubbers, polybutadiene rubbers, isoprene rubbers, core-shell rubbers, butylene oxide-ethylene oxide block copolymers, and the like. The rubbers are preferably present in the form of small particles that become dispersed in the polymer phase of the composite. The rubber particles can be dispersed within the epoxy resin or hardener and preheated together with the epoxy resin component or hardener prior to mixing them together.

Suitable particulate fillers have an aspect ratio of less than 5, preferably less than 2, and do not melt or thermally degrade under the conditions of the curing reaction. Suitable fillers include, for example, glass flakes, aramid particles, carbon black, carbon nanotubes, various clays such as montmorillonite, and other mineral fillers such as wollastonite, talc, mica, titanium dioxide, barium sulfate, calcium carbonate, calcium silicate, flint powder, carborundum, molybdenum silicate, sand, and the like. Some fillers are somewhat electroconductive and their presence in the composite can increase the electroconductivity of the composite. In some applications, notably automotive applications, it is preferred that the composite is sufficiently electroconductive that coatings can be applied to the composite using so-called "e-coat" methods, in which an electrical charge is applied to the composite and the coating becomes electrostatically attracted to the composite. Conductive fillers of this type include metal particles (such as aluminum and copper), carbon black, carbon nanotubes, graphite and the like.

Thermosets are formed from the curable epoxy resin composition of the invention by mixing the epoxy resin mixture with the hardener, and allowing the resulting curable epoxy resin composition to cure. Either or both of the epoxy resin mixture and hardener can be preheated if desired before they are mixed with each other. It is generally preferred to heat the curable epoxy resin composition to an elevated temperature, such as from 60 to 220° C., to accelerate the cure.

In certain embodiments, the curable epoxy resin composition is cured in the presence of reinforcing fibers to form a fiber-reinforced composite. The reinforcing fibers are thermally stable and have a high melting temperature, such that the reinforcing fibers do not degrade or melt during the curing process. Suitable fiber materials include, for example, glass, quartz, polyamide resins, boron, carbon, wheat straw, hemp, sisal, cotton, bamboo and gel-spun polyethylene fibers.

The reinforcing fibers can be provided in the form of short (0.5 to 15 cm) fibers, long (greater than 15 cm) fibers or continuous rovings. The fibers can be provided in the form of a mat or other preform if desired; such mats or performs may in some embodiments be formed by entangling, weaving or stitching the fibers, or by binding the fibers together using an adhesive binder. Preforms may approximate the size and shape of the finished composite article (or portion thereof that requires reinforcement). Mats of continuous or shorter fibers can be stacked and pressed together, typically with the aid of a tackifier, to form preforms of various thicknesses, if required.

Suitable tackifiers for preparing performs (from either continuous or shorter fibers) include heat-softenable polymers such as described, for example, in U.S. Pat. Nos. 4,992,228, 5,080,851 and 5,698,318. The tackifier should be compatible with and/or react with the polymer phase of the composite so that there is good adhesion between the polymer and reinforcing fibers. A heat-softenable epoxy resin or mixture thereof with a hardener as described in U.S. Pat. No. 5,698,318 is especially suitable. The tackifier may contain other components, such as one or more catalysts, a thermoplastic polymer, a rubber, or other modifiers.

A sizing or other useful coating may be applied onto the surface of the fibers before they are contacted with the curable epoxy resin composition and formed into a composite. A sizing often promotes adhesion between the cured epoxy resin and the fiber surfaces. The sizing in some embodiments may also have a catalytic effect on the reaction between the epoxy resin and the hardener.

Fiber-reinforced composites are in general made in accordance with the invention by mixing the epoxy resin mixture with the hardener to form a curable epoxy resin composition, wetting the fibers with the curable epoxy resin composition, and then curing the composition in the presence of the reinforcing fibers. It is also possible to first wet the reinforcing fibers with either the epoxy resin mixture or the hardener (such as by dispersing the fibers into them) and then mixing the epoxy resin mixture with the hardener in the presence of the fibers. Another alternative is to apply the epoxy resin mixture and the hardener simultaneously to the reinforcing fibers and mix them in the presence of the reinforcing fibers.

The curing step may be performed in a mold. In such a case, the reinforcing fibers may be introduced into the mold before the curable epoxy resin composition. This is normally the case when a fiber preform is used. The fiber preform is placed into the mold and the curable epoxy resin composition is then injected into the closed mold, where it penetrates between the fibers in the preform and then cures to form a composite product.

Alternatively, the fibers (including a preform) can be deposited into an open mold and the curable epoxy resin composition can be sprayed or injected onto the preform and into the mold. After the mold is filled in this manner, the mold is closed and the curable epoxy resin composition cured.

In another alternative process, the curable epoxy resin composition can be applied to the fibers prior to introducing the fibers into the mold, typically by mixing the epoxy resin composition the hardener and applying (such as by spraying) the resulting curable epoxy resin composition onto the fibers. The wetted fibers are then transferred into a mold and cured.

Short fibers can be injected into the mold with the hot curable epoxy resin composition. Such short fibers may be, for example, blended with the epoxy resin or hardener (or both), prior to forming the curable epoxy resin composition. Alternatively, the short fibers may be added into the curable epoxy resin composition at the same time as the epoxy and hardener are mixed, or afterward, but prior to introducing the hot curable epoxy resin composition into the mold.

Alternatively, short fibers can be sprayed into a mold. In such cases, the curable epoxy resin composition can also be sprayed into the mold, at the same time or after the short fibers are sprayed in. When the fibers and curable epoxy resin composition are sprayed simultaneously, they can be mixed together prior to spraying. Alternatively, the fibers and curable epoxy resin composition can be sprayed into the mold separately but simultaneously. In a process of particular interest, long fibers are chopped into short lengths and the chopped fibers are sprayed into the mold, at the same time as or immediately before the hot curable epoxy resin composition is sprayed.

Composites made in accordance with the invention may have fiber contents of at least 10 volume percent, preferably at least 25 volume percent or at least 35 volume percent, up to 80 volume percent, preferably up to 70 volume percent, more preferably up to 60 volume percent. The composites may have a void volume of 10% or less, 5% or less or 2% or less.

The mold may contain, in addition to or instead of the reinforcing fibers, one or more inserts. Such inserts may function as reinforcements, and in some cases may be present for weight reduction purposes. Examples of such inserts include, for example, wood, plywood, metals, various polymeric materials (which may be foamed or unfoamed) such as polyethylene, polypropylene, another polyolefin, a polyurethane, polystyrene, a polyamide, a polyimide, a polyester, polyvinylchloride and the like, various types of composite materials and the like. Such inserts should no become distorted or degraded at the temperatures encountered during the molding step.

The mold and the fibers (and the insert, if any) may be heated to the curing temperature or some other useful elevated temperature prior to contacting them with the curable epoxy resin composition. The mold surface may be treated with an external mold release agent, which may be solvent or water-based.

The particular equipment that is used to mix the components of the curable epoxy resin composition and transfer the composition to the mold is not considered to be critical to the invention, provided the curable epoxy resin composition can be transferred to the mold before it attains a high viscosity or develops significant amounts of gels. The process of the invention is amenable to resin transfer molding (RTM), vacuum-assisted resin transfer molding (VART), resin film infusion (RFI), Seemans Composites Resin Infusion Molding Process (SCRIMP) and liquid compression molding (LCM) processing methods and equipment, as well as to other methods.

The mixing apparatus can be of any type that can produce a homogeneous mixture of the epoxy resin mixture and hardener (and any optional components that are also mixed in at this time). Mechanical mixers and stirrers of various types may be used. In some embodiments, the mixing and dispensing apparatus includes an impingement mixer. The epoxy resin and hardener (and other components which are mixed in at this time) are pumped under pressure into a mixing head where they are rapidly mixed together. The resulting curable epoxy resin composition is then preferably passed through a static mixing device to provide further additional mixing, and then dispensed.

The mold is typically a metal mold, but it may be ceramic or a polymer composite provided that the mold is capable of withstanding the pressure and temperature conditions of the molding process. The mold may contain one or more inlets in liquid communication with the mixer(s), through which the curable epoxy resin composition is introduced. The mold may contain vents to allow gases to escape as the curable epoxy resin composition is injected.

The mold is typically held in a press or other apparatus which allows it to be opened and closed, and which can apply pressure on the mold to keep it closed during the filling and curing operations. The mold or press may be provided with means by which heat or cooling can be provided.

An advantage of this invention is that the alkoxylated hydrophobe (and preferably also the phosphate ester salt, if used) can be premixed with the epoxy resin and stored as a mixture, even at elevated temperatures, prior to being mixed with the hardener and cured. This has the dual advantages of eliminating the problem of accurately dosing the internal mold release agent (as the dosage is set beforehand when the alkoxylated hydrophobe and epoxy resin are mixed) and of avoiding the stability problems seen with other internal mold release agents.

Therefore, the invention is of particular importance in a process in which the alkoxylated hydrophobe (and preferably the phosphate ester salt, if used) and epoxy resin are blended to form an epoxy resin mixture which is stored at an elevated temperature, such as from 50 to 100° C., for a period of at least 1 day, in some embodiments at least 2 days, at least 3 days or at least 8 days, to 20 days or more, prior to being mixed with the hardener and cured. For example, the epoxy resin mixture may be stored in a storage tank or other apparatus, optionally with a recirculation of the epoxy resin mixture, for a time period as just indicated. The storage tank or other apparatus may hold enough of the epoxy resin mixture for two or more days' production, and/or hold the epoxy resin mixture during periods of inactivity (such as, for example, weekends, holidays or other work stoppages), while maintaining the epoxy resin mixture at the aforementioned elevated temperatures. Under such circumstances, the residence time of at least a portion of the epoxy resin mixture at the elevated temperature may range for several days as mentioned above, before being combined with a hardener and cured.

The process of the invention is useful to make a wide variety of composite products, including various types of automotive parts. Examples of these automotive parts include vertical and horizontal body panels, automobile and truck chassis components, and so-called "body-in-white" structural components.

The following examples are provided to illustrate the invention, but not limit the scope thereof. All parts and percentages are by weight unless otherwise indicated. In the following examples:

Epoxy Resin A is a diglycidyl ether of bisphenol A having an epoxide equivalent weight of 180. It contains about 0.5% by weight of monohydrolyzed species.

Epoxy Resin B is a diglycidyl ether of bisphenol A having an epoxide equivalent weight of 174. It contains about 0.5% by weight of monohydrolyzed species.

Epoxy Resin C is a diglycidyl ether of bisphenol A having an epoxide equivalent weight of 187. It contains about 5% by weight of monohydrolyzed species.

IMR A is an ethoxylated fatty acid available commercially by E. and P. Wuertz GmbH and Co. KG as Wuertz Pat-657/BW. It contains ethoxylated fatty acids and fatty acid mono- and di-glycerides.

IMR B is an ethoxylated secondary alcohol sold commercially by the Dow Chemical Company as Tergitol™ 15-S-12. It has a reported HLB of 14.5 and approximately 12 moles of polymerized ethylene oxide per molecule. All of the hydroxyl groups of this material are primary hydroxyls.

IMR C is an ethoxylated cashew oil sold commercially by Cardolite Corporation as Cardolite™ GX-5167.

IMR D is an ethoxylated and propoxylated mixture of n-hexadecanol and n-octadecanol sold commercially by The Dow Chemical Company as Dowfax™25A414. It is prepared by sequentially adding about 5 moles of ethylene oxide and then about 12 moles of propylene oxide to one mole of a mixture of n-hexadecanol and n-octadecanol. IMR D has an internal poly(ethylene oxide) block and a terminal polypropylene oxide) block. It contains almost exclusively secondary hydroxyl groups.

IMR E is a made by randomly copolymerizing 1,2-propylene oxide and 1,2-butylene oxide onto dodecanol. It is sold commercially by The Dow Chemical Company as UCON™ OSP-220. Its kinematic viscosity at 40° C. is 220 cSt (centistokes) as measured by ASTM D445 and its pour point is −37° C. as measured by ASTM D97. The weight fraction of oxypropylene and oxybutylene units is 1:1. It contains almost exclusively secondary hydroxyl groups.

SCREENING EXAMPLES 1 AND 2 AND COMPARATIVE SAMPLES A-D

50/50 by weight mixtures of an epoxy resin and an IMR agent are prepared as indicated in Table 1.

The IMR candidates are separately mixed with an equal weight of an epoxy resin and stirred at room temperature until mixed. The large amount of IMR candidate, well in excess of typical use levels, is chosen so the reaction between the IMR candidate and the epoxy resin, if any, could be detected easily by differential scanning calorimetry (DSC). The stability of the resulting epoxy resin/IMR mixtures is evaluated by DSC. The enthalpy of reaction is an indication of the extent of the reaction between the IMR agent and the epoxy resin, with higher enthalpies indicating more reaction.

TABLE 1

DSC evaluation of 50/50 IMR/Epoxy Resin Mixtures

| Designation | Epoxy Resin | IMR agent | Enthalpy of Reaction |
|---|---|---|---|
| Comp. Sample A | A | A | 50 J/g |
| Comp. Sample B | B | A | 55 J/g |
| Comp. Sample C | A | B | 10 J/g |
| Comp. Sample D | A | C | 53 J/g |

TABLE 1-continued

DSC evaluation of 50/50 IMR/Epoxy Resin Mixtures

| Designation | Epoxy Resin | IMR agent | Enthalpy of Reaction |
|---|---|---|---|
| Ex. 1 | A | D | 0 J/g |
| Ex. 2 | A | E | 0 J/g |

IMR agents A-C each react significantly with Epoxy Resin A. IMR agent A reacts similarly with Epoxy Resin B. Conversely, no reaction is detected between Epoxy Resin A and either of IMR agents D and E, even at the very high concentrations of IMR candidate used in these experiments.

EXAMPLES 3-6 AND COMPARATIVE SAMPLES E-H

IMR candidates are mixed with epoxy resins as indicated in Table 2, in a weight ratio of 2:100. These mixtures are stored at 80° C. under air with stirring for 22 days. They are inspected visually for the formation of particulates. The formation of particulates is indicative of instability in the resin/IMR mixture. Results are as indicated in Table 2

TABLE 2

Stability of 2% IMR mixtures at 80° C.

| Designation | Epoxy Resin | IMR agent | Particle Formation? |
|---|---|---|---|
| Comp. Sample E | A | A | After 1 day |
| Comp. Sample F | A | B | Not Determined |
| Comp. Sample G | A | C | After 1 day |
| Example 3 | A | D | None after 20 days |
| Example 4 | A | E | None after 20 days |
| Comp. Sample H | C | A | None after 20 days |
| Example 5 | C | D | None after 20 days |
| Example 6 | C | E | None after 20 days |

As can be seen by comparing the results in Tables 1 and 2, the DSC results correlate well with observed elevated temperature stability of the IMR/epoxy resin mixtures. IMR agents A, B and C all show significant reactivity with Epoxy Resin A on DSC, and mixtures of those IMR agents with Epoxy Resin A also form particles when stored at 80° C. The 80° C. storage conditions are typical of conditions encountered in industrial scale composite production equipment. This equipment typically includes a heated storage tank in which the epoxy resin/IMR mixture is stored at elevated temperature for periods that can extend until several days. The formation of particles in each of Comparative Samples A-D demonstrates that those epoxy resin/IMR mixtures are too instable to be processed on such production equipment under these conditions. The use of these IMR candidates therefore requires them to be added as separate streams to be mixed with the epoxy resin and hardener in the mixhead of the production apparatus. The small volume of the IMR stream leads to difficulties in metering the material accurately, and leads to inconsistent release characteristics, with frequent adhesion of the parts to the mold.

By contrast, mixtures of Epoxy Resin A with either of IMR agents D or E show no sign of reactivity on either the DSC test (Ex. 1 and 2) or upon storage at 80° C. for up to 20 days (Ex. 3 and 4). Mixtures of Epoxy Resin C with either of IMR agents D or E show no sign of reactivity upon storage at 80° C. for up to 20 days (Ex. 5 and 6). These mixtures are easily processed on industrial composite production equipment.

EXAMPLES 7-12 AND COMPARATIVE SAMPLES I-L

Examples 7-12 are made and tested according to the following general procedure. The epoxy resin and internal mold release candidates as set forth in Table 3 are combined at room temperature and stirred to form a uniform mixture. Separately, a triethylene tetraamine product containing less than 0.3 weight percent aminoethylethanolamine (TETA-E from The Dow Chemical Company) is combined with triethylenediamine at a mole ratio of 10:1.

A portion of each epoxy resin mixture is heated to a temperature 80° C. and blended with a room temperature portion of the triethylene tetraamine mixture. The mixing ratio is indicated in Table 3. The resulting curable epoxy resin composition is blended by hand for about 30 seconds and poured onto a preheated (130° C.) hot plate to form a disk. The hot plate temperature is maintained at 130° C. until the epoxy resin composition has cured. A line is scored through the disk periodically with a pallet to follow the extent of cure. When the disk has cured enough that it cannot be scored with the pallet knife, the cured disk is removed from the hot plate surface using a spatula. The release characteristics are assessed qualitatively. A "very good" rating is indicated by minimal if any sticking. A "good" rating is indicated by a small amount of sticking, although the disk is nonetheless easily removed. A "fair" rating indicates that the disk could be removed from the hot plate with significant effort. A "poor" rating indicates that the disk could be removed only with substantial effort that leads to permanent deformation of the cured resin. The glass transition temperature of each disk is measured by DSC. The sample is heated from room temperature to 200° C. at 20° C./minute, held at 200° C. for 3 minutes, cooled to room temperature at a rate of 20° C./minute, and then again heated to 200° C. at 20° C./minute. Glass transition temperature is measured on the second heating segment as the midpoint of the transition.

Where indicated in Table 3, the remaining amounts of each of the epoxy resin/IMR candidate mixtures are heated continuously at 80° C. with stirring for 22 days. Samples are withdrawn after 1, 8, 12 and 22 days heating, and used to make cured disks as described above. The release characteristics and glass transition temperature are measured in each case. Results are as indicated in Table 3.

TABLE 3

| | Comp. Samp. I | Ex. 7 | Ex. 8 | Ex. 9 | Ex. 10 | Comp. Samp. J | Comp. Samp. K | Comp. Samp. L | Ex. 11 | Ex. 12 |
|---|---|---|---|---|---|---|---|---|---|---|
| Epoxy Resin (type, pbw) | A, 98 | A, 98 | A, 98 | A, 98 | A, 98 | A, 98 | A, 98 | C, 98 | C, 98 | C, 98 |
| IMR Candidate (type, pbw) | A, 2 | D, 2 | D, 1.5 | E, 2 | E, 2 | B, 2 | C, 2 | A, 2 | D, 2 | E, 2 |
| Phosphate Salt (pbw) | 0 | 0 | 0.5 | 0 | 0.5 | 0 | 0 | 0 | 0 | 0 |
| Epoxy/Hardener Ratio | 100:16.2 | 100:16.2 | 100:16.2 | 100:16.2 | 100:16.2 | 100:16.2 | 100:16.2 | 100:14.1 | 100:14.1 | 100:14.1 |
| 0 Days Storage Results | | | | | | | | | | |
| Release Rating | Very good | Good | Very Good | Good | Very Good | Poor | Good | Very Good | Good | Good |
| $T_g$, ° C. | 122 | 120 | 130 | 127 | 130 | N.D. | N.D. | 124 | 122 | 131 |
| 1 Day Storage Results | | | | | | | | | | |
| Release Rating | Fair | Good | N.D. | N.D. | N.D. | N.D. | N.D. | Very Good | Good | Good |
| $T_g$, ° C. | 119 | 120 | N.D. | N.D | N.D. | N.D. | N.D. | 124 | 122 | 131 |
| 8 Days Storage Results | | | | | | | | | | |
| Release Rating | Poor | Good | N.D. | N.D. | N.D. | N.D. | N.D. | Good | Good | Good |
| $T_g$, ° C. | 119 | 120 | N.D. | N.D. | N.D. | N.D. | N.D. | 123 | 122 | 131 |
| 12 Days Storage Results | | | | | | | | | | |
| Release Rating | Poor | Good | N.D. | N.D. | N.D. | N.D. | N.D. | Good | Good | Good |
| $T_g$, ° C. | 119 | 120 | N.D. | N.D. | N.D. | N.D. | N.D. | 122 | 122 | 131 |
| 22 Days Storage Results | | | | | | | | | | |
| Release Rating | Poor | Good | N.D. | N.D. | N.D. | N.D. | N.D. | Good | Good | Good |
| $T_g$, ° C. | 113 | 120 | N.D. | N.D. | N.D. | N.D. | N.D. | 120 | 122 | 131 |

The data in Table 3 shows the performance of various IMR candidates in Epoxy Resin A (Ex. 7-10 and Comp. Samples I, J and K) and Epoxy Resin C (Ex. 11-12 and Comp. Sample L).

Comp. Sample I represents a commercial benchmark. In this case, IMR candidate A provides very good release before the epoxy resin/IMR mixture is heat-aged. The glass transition temperature of Comp. Sample I is 122° C. before the epoxy resin/IMR mixture is heat aged. As shown in Table 3, heat aging of the epoxy resin/IMR mixture has a large adverse effect on release properties and glass transition temperature. The deterioration of these properties is consistent with a reaction of epoxy and resin and IMR candidate A as it is heat-aged.

Example 7 (containing IMR candidate D) does not release quite as well as Comp. Sample I before heat aging, and has a slightly lower glass transition temperature. But heat aging causes no deterioration of either of these properties. After only one day aging, Example 7 performs better on both counts than Comp. Sample I. Even better results are obtained when IMR candidate D is used together with a phosphate ester salt, as in Example 8. Even before heat aging, release is comparable to that of Comp. Sample I, and the glass transition temperature is considerably higher.

Comparative Sample J releases poorly, even without heat aging. Comparative Sample K releases well before heat aging, but as shown above, IMR candidate C is very reactive with Epoxy Resin A and is expected to perform worse with heat aging.

Comparative Sample L and Examples 11-12 compare the performance of various IMR candidates in Epoxy Resin C. Epoxy Resin C contains a significant fraction of monohydrolyzed species, and as such cures more slowly than Epoxy Resin A or B and may be disfavored when a very rapid cure is needed. IMR candidate A performs well before heat aging, but as with Comp. Sample I, those properties deteriorate with heat aging, albeit more slowly in this case. With IMR candidate D (Ex. 11), initial performance is similar to Comp. Sample I, but there is no deterioration of properties with heat aging. IMR candidate E provides comparable release and a higher glass transition temperature with no deterioration of those properties with heat aging.

What is claimed is:

1. An epoxy resin mixture comprising at least one epoxy resin mixed with 0.2 to 5 parts by weight, per 100 parts by weight of the at least one epoxy resin, of one or more alkoxylated hydrophobes that include a poly(alkylene oxide) chain of at least 5 oxyalkylene units having i) a terminal hydroxyl group, provided that at least 50% of the hydroxyl groups provided by the one or more alkoxylated hydrophobes are secondary hydroxyl groups, or ii) a terminal $C_{1-8}$ hydrocarbyl group, the poly(alkylene oxide) chain being bonded at one end through a linking group to a hydrophobe, wherein the hydrophobe is a straight-chain alkyl group having 10 to 24 carbon atoms; a straight-chain mono-, di- or tri-alkene having 10 to 24 carbon atoms; or an alkyl- or alkenyl-substituted phenyl in which the alkyl or alkenyl group is a straight-chain group having 10 to 24 carbon atoms.

2. The epoxy resin mixture of claim 1, wherein the poly(alkylene oxide) chain is a poly(1,2-propylene oxide), a block copolymer having an internal poly(ethylene oxide) block and a terminal poly(1,2-propylene oxide) block, a block copolymer having an internal poly(ethylene oxide) block and a terminal poly(1,2-butylene oxide) block, a block copolymer having a poly(1,2-propylene oxide) block and a poly(1,2-butylene oxide) block or a random copolymer of 1,2-propylene oxide and 1,2-butylene oxide.

3. The epoxy resin mixture of claim 1, wherein the alkoxylated hydrophobe is made by alkoxylating a straight-chain alkyl group having 10 to 18 carbon atoms with a mixture of 1,2-propylene oxide and 1,2-butylene oxide.

4. The epoxy resin mixture of claim 1, wherein the alkoxylated hydrophobe is made by sequentially alkoxylating a straight-chain alkyl group having 10 to 18 carbon atoms with ethylene oxide and then 1,2-propylene oxide.

5. The epoxy resin mixture of claim 1 wherein the alkoxylated hydrophobe has hydroxyl groups, and at least 85% of the hydroxyl groups of the alkoxylated hydrophobe are secondary hydroxyl groups.

6. The epoxy resin mixture of claim 1 wherein the epoxy resin contains 80 to 100 weight percent, based on the weight of the epoxy resin, of a polyglycidyl ether of a polyphenol having a number average of 1.8 to 3 epoxy groups per molecule and a number average epoxy equivalent weight of 125 to 225.

7. The epoxy resin mixture of claim 1, further comprising an alkali metal, ammonium or phosphonium salt of a phosphate ester.

8. The epoxy resin mixture of claim 1 wherein the at least one epoxy resin contains no more than 1% by weight of monohydrolyzed resin species.

9. A method for making a cured epoxy resin, comprising filling a mold with a curable epoxy resin composition and curing the curable epoxy resin composition in the mold, wherein the curable epoxy resin composition includes a hardener and an epoxy resin mixture that contains at least one epoxy resin mixed with 0.5 to 5 parts by weight, per 100 parts by weight of the at least one epoxy resin, of an alkoxylated hydrophobe that includes a poly(alkylene oxide) chain of at least 5 oxyalkylene units having i) a terminal hydroxyl group, provided that at least 50% of the hydroxyl groups provided by the one or more alkoxylated hydrophobes are secondary hydroxyl groups, or ii) a terminal hydrocarbyl group, the poly(alkylene oxide) chain being bonded at one end through a linking group to a hydrophobe, wherein the hydrophobe is a straight-chain alkyl group having 10 to 24 carbon atoms, a straight-chain mono-, di- or tri-alkene having 10 to 24 carbon atoms; or an alkyl- or alkenyl-substituted phenyl in which the alkyl or alkenyl group is a straight-chain group having 10 to 24 carbon atoms and wherein the at least one epoxy resin contains no more than 1% by weight of monohydrolyzed resin species.

10. The method of claim 9, wherein the epoxy resin mixture is preheated to a temperature of 50 to 100° C., and then mixed with the hardener.

11. The method of claim 10, wherein the epoxy resin mixture is preheated to a temperature of 50 to 100° C. for a period of at least one day, and then mixed with the hardener.

12. The method of claim 9, wherein the poly(alkylene oxide) chain is a poly(1,2-propylene oxide), a block copolymer having an internal poly(ethylene oxide) block and a terminal poly(1,2-propylene oxide) block, a block copolymer having an internal poly(ethylene oxide) block and a terminal poly(1,2-butylene oxide) block, a block copolymer having a poly(1,2-propylene oxide) block and a poly(1,2-butylene oxide) block or a random copolymer of 1,2-propylene oxide and 1,2-butylene oxide.

13. The method of claim 9 wherein the alkoxylated hydrophobe has hydroxyl groups, and at least 85% of the hydroxyl groups of the alkoxylated hydrophobe are secondary hydroxyl groups.

14. The method of claim 9, wherein the alkoxylated hydrophobe is made by alkoxylating a straight-chain alkyl group having 10 to 18 carbon atoms with a mixture of 1,2-propylene oxide and 1,2-butylene oxide.

15. The method of claim 9, wherein the alkoxylated hydrophobe is made by sequentially alkoxylating a straight-chain alkyl group having 10 to 18 carbon atoms with ethylene oxide and then 1,2-propylene oxide.

16. The method of claim 9 wherein the epoxy resin contains 80 to 100 weight percent, based on the weight of the epoxy resin, of a polyglycidyl ether of a polyphenol having a number average of 1.8 to 3 epoxy groups per molecule and a number average epoxy equivalent weight of 125 to 225.

17. The method of claim 9, further comprising an alkali metal, ammonium or phosphonium salt of a phosphate ester.

18. The method of claim 9 wherein the at least one epoxy resin contains no more than 1% by weight of monohydrolyzed resin species.

* * * * *